United States Patent
Gyobu

(10) Patent No.: US 9,600,426 B2
(45) Date of Patent: Mar. 21, 2017

(54) BUS CONTROL DEVICE, IMAGE PROCESSING APPARATUS, AND BUS CONTROL METHOD

(71) Applicant: Yoshikazu Gyobu, Kanagawa (JP)

(72) Inventor: Yoshikazu Gyobu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 751 days.

(21) Appl. No.: 13/948,695

(22) Filed: Jul. 23, 2013

(65) Prior Publication Data

US 2014/0047147 A1   Feb. 13, 2014

(30) Foreign Application Priority Data

Aug. 7, 2012   (JP) ................................. 2012-174529

(51) Int. Cl.
G06F 13/362   (2006.01)
G06F 13/374   (2006.01)

(52) U.S. Cl.
CPC ................................. G06F 13/374 (2013.01)

(58) Field of Classification Search
CPC . G06F 3/18; G06F 13/37; G06F 3/268; G06F 13/372
See application file for complete search history.

(56) References Cited

U.S. PATENT DOCUMENTS

| 2005/0240707 | A1* | 10/2005 | Hayashi | G06F 13/364 710/309 |
| 2010/0312935 | A1* | 12/2010 | Higuchi | G06F 13/374 710/112 |
| 2010/0325375 | A1* | 12/2010 | Ueno | G06F 13/1626 711/158 |
| 2012/0047299 | A1* | 2/2012 | Sasaki | G06F 13/362 710/244 |

FOREIGN PATENT DOCUMENTS

| JP | 2000-500895 A | 1/2000 |
| JP | 2002-269032 | 9/2002 |
| JP | 2005-316608 A | 11/2005 |
| JP | 2005-316621 A | 11/2005 |
| JP | 2007-164428 A | 6/2007 |

OTHER PUBLICATIONS

Office Action issued on Jul. 5, 2016 in Japanese Patent Application No. 2012-174529.

* cited by examiner

Primary Examiner — Tim T Vo
Assistant Examiner — Phong H Dang
(74) Attorney, Agent, or Firm — Oblon, McClelland, Maier & Neustadt, L.L.P.

(57) ABSTRACT

A bus control device includes a plurality of bus masters classified into a plurality of groups according to a priority level, a plurality of group buses each group bus being connected to a corresponding group of bus masters and assigned with a priority level determined according to the priority levels of the corresponding group of bus masters, an upper priority bus that arbitrates a plurality of bus obtaining requests received from the plurality of bus maters via the plurality of group buses, a plurality of masks respectively provided for the plurality of bus masters to mask the bus obtaining request addressed to the corresponding group bus from the corresponding bus master, and a plurality of mask controllers respectively provided for the plurality of group buses to output at least one mask signal that controls operation of at least one corresponding mask connected to the corresponding group bus.

20 Claims, 4 Drawing Sheets

BUS CONTROL DEVICE, IMAGE PROCESSING APPARATUS, AND BUS CONTROL METHOD

CROSS-REFERENCE TO RELATED APPLICATIONS

This patent application is based on and claims priority pursuant to 35 U.S.C. §119 to Japanese Patent Application No. 2012-174529, filed on Aug. 7, 2012, in the Japan Patent Office, the entire disclosure of which is hereby incorporated by reference herein.

BACKGROUND

Technical Field

The present invention relates to a bus control device, an image processing apparatus, and a bus control method, and more specifically to a bus control device, an image processing apparatus, and a bus control method each of which is capable of arbitrating a bus obtaining request.

Description of the Related Art

The recent data processing apparatuses, such as image processing apparatuses including, for example, multifunctional peripherals, printers, copiers, scanners, and facsimiles, may be provided with a plurality of units such as a scanner unit, printer unit, and controller provided with an image memory. These units are connected through a general-purpose bus that functions as a common interface. Providing the general-purpose bus suppresses the addition of a circuit that may not be useful or the increase in number of control software components, which may be caused due to extension of units, while at the same time improving scalability of the system.

For the integrated circuit (IC) such as the Application Specific Integrated Circuit (ASIC) or the System on Chip (SoC) incorporating a sub CPU, each module is connected to a memory via an internal bus such that each module accesses the bus according to a bus protocol. More specifically, the module is provided with a bus master such as a direct memory access controller (DMAC). The bus master outputs a bus obtaining request to a bus arbiter, and when permitted, obtains an access right to the memory via a slave. In such case, the bus arbiter, which is capable of assigning a priority level, defines a priority level for each bus master. For example, assuming that the bus arbiter receives a bus obtaining request from a high-priority bus master one cycle after the time at which the request is received from the low-priority bus master, the bus arbiter assigns the low-priority bus master with a memory access right such that the bus will be used by the low-priority bus master for a predetermined time period. This may not be desirable in some cases. For example, the image processing apparatus includes devices that may require isochronous transfer (real-time capability) such as scanners or printers, and devices that may not require isochronous transfer. In such case, it is desirable to assign a bus master access right to the devices requiring isochronous transfer with higher priority.

Japanese Patent Application Publication No. JP-2002-269032-A proposes a bus arbiter. When there is a bus acquirement request from a first bus master, which is generated with the occurrence of a specified event in a device provided with the bus arbiter, the frequency in assigning a bus use right is restricted more than a regular case where the specified event is not generated, with respect to the bus acquirement request from the bus master other than the first bus master. More specifically, the bus acquirement request from the other bus master is masked for a predetermined time period to prohibit the access right from being assigned to the other bus master, thus securing a bus range for use by the first bus master. In order to assign a bus access right to a specific bus master with higher priority through masking the bus acquirement request for the other bus master, a mask time measurement unit such as a counter to restrict the frequency in assigning the bus access right is provided for each of a plurality of masks. Since the mask time measurement unit is provided for each mask, with the increase in number of bus masters due to the demands for larger ASIC or SoC systems, the number of mask time measurement units for controlling the bus access right increases. This may result in larger circuit sizes, more complicated circuit designs, or higher costs.

SUMMARY

Example embodiments of the present invention include a bus control device including: a plurality of bus masters respectively assigned with different priority levels in accessing a slave, and classified into a plurality of groups of bus masters according to the priority level; a plurality of group buses, each group bus being connected to a corresponding group of bus masters, and being assigned with a priority level determined according to the priority levels of the corresponding group of bus masters; an upper priority bus having a priority level higher than the priority level of any one of the plurality of group buses and configured to arbitrate a plurality of bus obtaining requests received from the plurality of bus maters via the plurality of group buses; a plurality of masks respectively provided for the plurality of bus masters and each configured to mask the bus obtaining request addressed to the corresponding group bus from the corresponding bus master; and a plurality of access controllers respectively provided for the plurality of group buses, and each configured to output at least one mask signal that controls operation of at least one corresponding mask connected to the corresponding group bus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
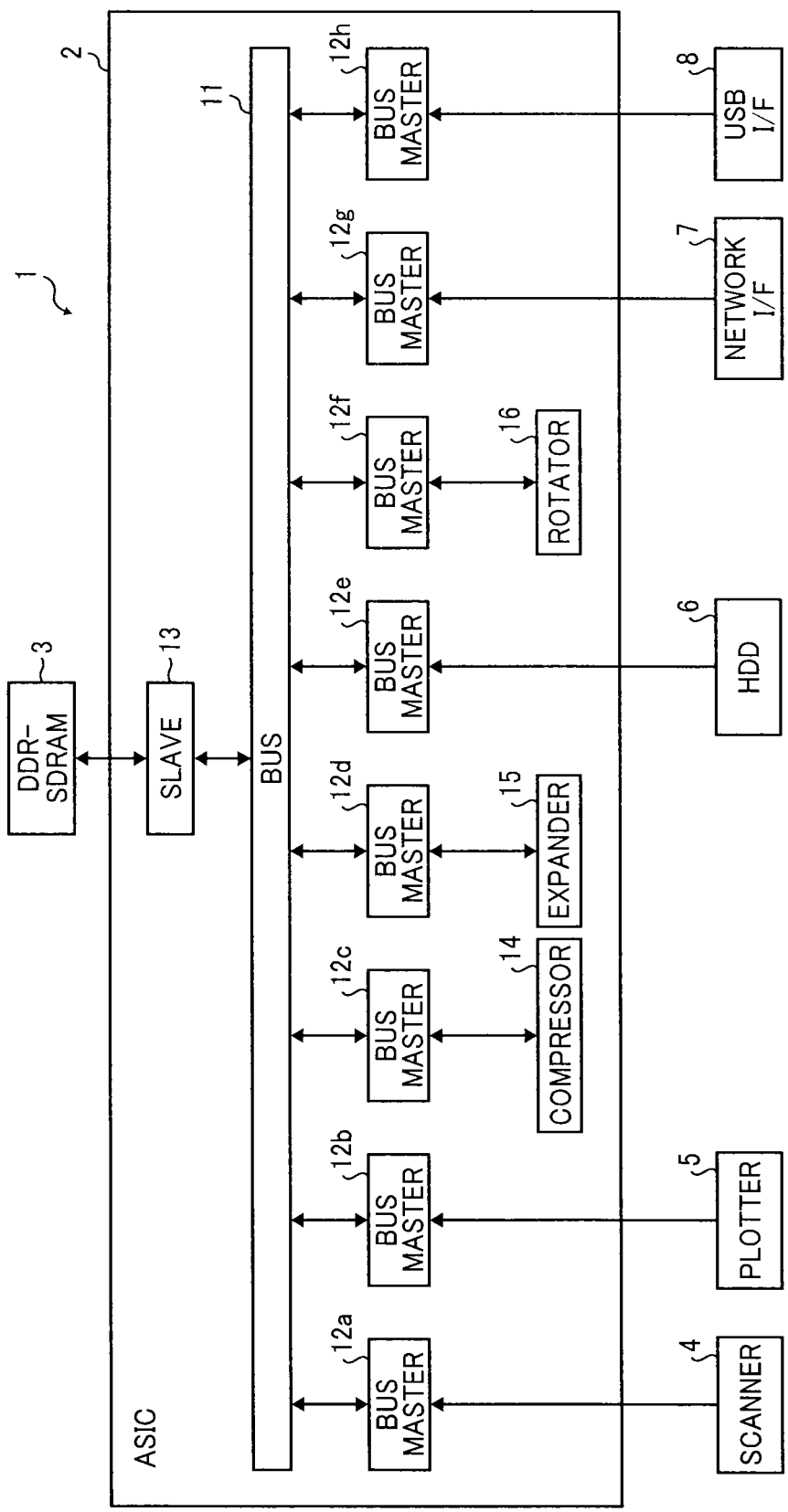
FIG. 1 is a schematic block diagram illustrating a selected portion of an image processing apparatus according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIGS. 1 to 5, a bus control device, an image processing apparatus, and a bus control method are explained according to an example embodiment of the present invention. FIG. 1 is a schematic block diagram illustrating a selected portion of the image processing apparatus 1 incorporating the bus control device, and capable of performing the bus control method.

Referring to FIG. 1, the image processing apparatus 1 includes an Application Specific Integrated Circuit (ASIC) 2, a double-data-rate synchronous dynamic random access memory (DDR-SDRAM) 3, a scanner 4, a plotter 5, a hard disk drive (HDD) 6, a network interface (I/F) 7, and a universal serial bus (USB) interface (I/F) 8. The image processing apparatus 1 may further include an operation device provided with a display. The image processing apparatus 1 may be implemented by any desired image processing apparatus such as a copier, a printer, a multifunctional peripheral, etc.

The scanner 4 may be implemented by an image scanner including a charged coupled device (CCD), which scans an original image and reads the original image into image data with a predetermined resolution. The scanner 4, which is mechanically operated at a predetermined speed, reads the original image to output the image data to the ASIC 2. The ASIC 2 temporarily stores the image data in the DDR-SDRAM 3.

The plotter 5 may be implemented by any desired plotter of inkjet type or electrophotographic image forming type. The plotter 5 receives the image data, deployed on the DDR-SDRAM 3, via the ASIC 2, and forms an image on a recording sheet line by line based on the image data. More specifically, the plotter 5, which is mechanically operated at a predetermined speed, forms the image on the recording sheet, based on the image data received from the DDR-SDRAM 3 via the ASIC 2.

The HDD 6 stores image data such as image data processed by the ASIC 2. The image data being stored in the HDD 6 may be read out for processing by the ASIC 2.

The network I/F 7 functions as an interface with any desired network connected to the network I/F 7, such as a local area network (LAN).

The USB I/F 8 is connected to a USB device such as a USB memory or an extension unit connected through a USB, such that it functions as an interface with the USB device.

The ASIC 2 includes a bus 11, a plurality of bus masters 12a to 12h (in this example, eight bus masters 12, collectively referred to as the bus master 12) connected to the bus 11, and a slave 13 connected to the bus 11. The bus master 12a is connected with the scanner 4. The bus master 12b is connected to the plotter 5. The bus master 12e is connected to the HDD 6. The bus master 12g is connected to the network I/F 7. The bus master 12h is connected to the USB I/F 8.

The ASIC 2 further includes a compressor 14 (may be referred to as an encoder), an expander 15 (may be referred to as a decoder), and a rotator 16. The bus master 12c is connected to the compressor 12. The bus master 12d is connected to the expander 15. The bus master 12f is connected to the rotator 16.

The scanner 4 stores the image data, which may be read from the original image by mechanically operating the scanner 4 at the predetermined speed, in the DDR-SDRAM 3, via the bus master 12a, bus 11, and slave 13. It is thus desirable to have the scanner 4 with the high-speed isochronous transfer capability.

The plotter 5, which is mechanically operated at the predetermined speed, obtains the image data read out from the DDR-SDRAM 3 via the bus master 12b, bus 11, and slave 13, and forms an image based on the image data. It is thus desirable to have the plotter 5 with the high-speed isochronous transfer capability.

The HDD 6 receives data such as image data to which image processing is applied by the ASIC 2, via the bus 12e, bus 11, and slave 13, from the DDR-SDRAM 3 to store the image data therein. The HDD 6 may further allow the image data to be read onto the DDR-SDRAM 3 via the bus 12e, bus 11, and slave 13. The high-speed isochronous transfer capability is thus not required for the HDD 6.

The network I/F 7 functions as a communication interface with the network and the image processing apparatus 1. The network I/F 7 sends the image data, which is temporarily stored in the DDR-SDRAM 3, to the network via the bus 12g, bus 11, and slave 13. The network I/F 7 writes image data received from the network onto the DDR-SDRAM 3, via the bus master 12g, bus 11, and slave 13. The high-speed isochronous transfer capability is thus not required for the network I/F 7.

The USB I/F 8 functions as an interface with the USB device being connected. The USB I/F 8 outputs data such as image data, being temporarily stored in the DDR-SDRAM 3, via the bus master 12h, bus 11, and slave 13. The USB I/F 8 writes data such as image data received from the USB device, onto the DDR-SDRAM 3, via the bus master 12h, bus 11, and slave 13. The high-speed isochronous transfer capability is thus not required for the USB I/F 8.

The compressor 14 compresses the image data read out from the DDR-SDRAM 3 via the bus master 12c, bus 11, and slave 13, in a predetermined compression format to generate compressed image data. The compressor 14 further stores the compressed image data on the DDR-SDRAM 3, via the bus master 12c, bus 11, and slave 13. The high-speed isochronous transfer capability is thus not required for the compressor 14.

The expander 15 expands the compressed image data, read out from the DDR-SDRAM 3 via the bus master 12d, bus 11, and slave 13, to generate expanded image data. The expander 15 stores the expanded image data onto the DDR-SDRAM 3, via the bus master 12d, bus 11, and slave 13. The high-speed isochronous transfer capability is thus not required for the expander 15.

The rotator 16 rotates the image data, read out from the DDR-SDRAM 3 via the bus master 12*f*, bus 11, and slave 13, with a predetermined angle, to generate rotated image data. The rotator 16 further stores the rotated image data onto the DDR-SDRAM 3, via the bus master 12*f*, bus 11, and slave 13. The high-speed isochronous transfer capability is thus not required for the rotator 16.

Figure 2:
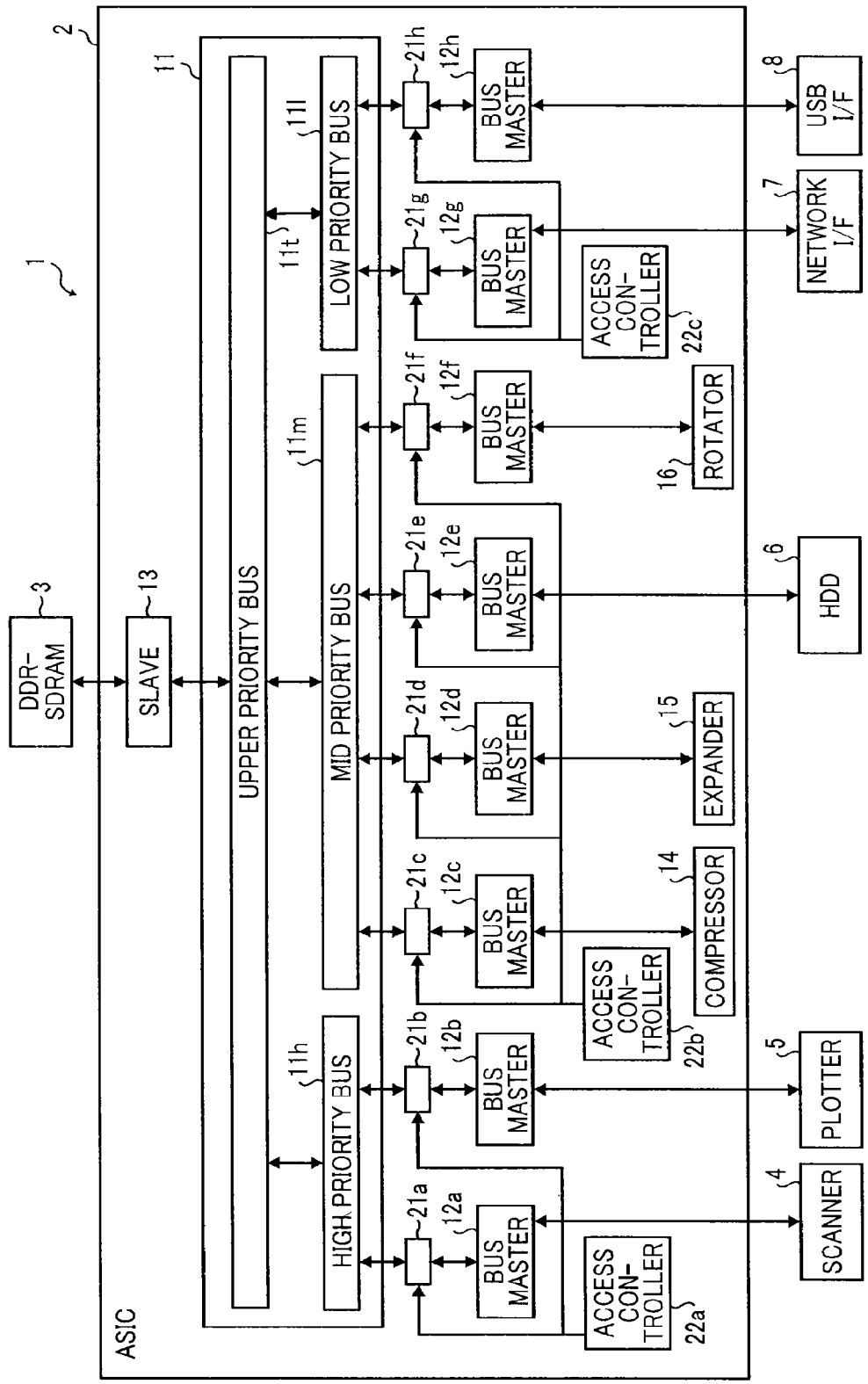
FIG. 2 is a schematic block diagram illustrating a bus in the selected portion of the image processing apparatus of FIG. 1.

As illustrated in FIG. 2, the bus 11 includes an upper priority bus 11*t*, and a plurality of groups of lower priority buses including a high-priority bus 11*h*, a medium-priority bus 11*m*, and a low-priority bus 11*l*, which are structured in layer. The high-priority bus 11*h* has the highest priority, and the low-priority bus 11*l* has the lowest priority, of the high-priority bus 11*h*, medium-priority bus 11*m*, and low-priority bus 11*l*. More specifically, the priority of the high-priority bus 11*h*, the medium-priority bus 11*m*, and the low-priority bus 11*l* are respectively set in this order.

The high-priority bus 11*h* is connected to the bus master 12*a* connected to the scanner 4, and the bus master 12*b* connected to the plotter 5. The medium-priority bus 11*m* is connected to the bus master 12*c* connected to the compressor 14, the bus master 12*d* connected to the expander 15, the bus master 12*e* connected to the HDD 6, and the bus master 12*f* connected to the rotator 16. The low-priority bus 11*e* is connected to the bus master 12*g* connected to the network I/F 7, and the bus master 12*h* connected to the USB I/F 8. The high-priority bus 11*h*, the medium-priority bus 11*m*, and the low-priority bus 11*l* are respectively connected to the upper priority bus 11*t*.

The upper priority bus 11*t* arbitrates bus obtaining requests ("req") received, respectively, from the high-priority bus 11*h*, the medium-priority bus 11*m*, and the low-priority bus 11*l* of the plurality of bus groups, according to the priority level, and assigns a request with an access right.

In the process of arbitration, the upper priority bus 11*t* may use the round-robin priority scheduling or the fixed priority arbitration, which may be of the bus built-in type. Alternatively, the upper priority bus 11*t* may apply the round-robin or the least recently used (LRU) arbitration with mask control from the outside. Using any of these techniques, the upper priority bus 11*t* assigns a bus range to the bus having the highest priority, selected from the high-priority bus 11*h*, the medium-priority bus 11*m*, and the low-priority bus 11*l*.

In this example, it is assumed that the upper priority bus 11*t* uses the LRU arbitration with mouse control from the outside, to arbitrate the req.

The bus masters 12*a* and 12*b* connected to the high-priority bus 11*h*, the bus masters 12*c* to 12*f* connected to the medium-priority bus 11*m*, and the bus masters 12*g* and 12*h* connected to the low-priority bus 11*l* are equal in priority with respect to the bus 11*h*, bus 11*m*, and bus 11*l*, such that the range needs to be distributed among the buses 11*h*, 11*m*, and 11*l*.

The ASIC 2 is provided with a plurality of masks 21*a* to 21*h* respectively corresponding to the bus masters 12*a* to 12*h*, each of which masks a bus obtaining request signal ("req signal") to the corresponding one of the high-priority bus 11*h*, the medium-priority bus 11*m*, and the low-priority bus 11*l*, received from any one of the bus masters 12*a* and 12*b* connected to the high-priority bus 11*h*, the bus masters 12*c* to 12*f* connected to the medium-priority bus 11*m*, and the bus masters 12*g* and 12*f* connected to the low-priority bus 11*l*. The ASIC 2 further includes a plurality of access controllers 22*a*, 22*b*, and 22*c*, each of which performs mask control. The access controllers 22*a*, 22*b*, and 22*c* are connected, respectively, to the masks 21*a* and 21*b* provided for the bus masters 12*a* and 12*b* connected to the high-priority bus 11*h*, the masks 21*c* to 21*f* provided for the bus masters 12*c* to 12*f* connected to the medium-priority bus 11*m*, and the masks 21*g* and 21*h* provided for the bus masters 12*g* to 12*h* connected to the low-priority bus 11*l*. The access controllers 22*a*, 22*b*, and 22*c* respectively perform mask control on the bus masters 12*a* and 12*b* for the bus 11*h*, the bus masters 12*c* to 12*f* for the bus 11*m*, and the bus masters 12*g* and 12*h* for the bus 11*l*. With the decreased in number of access controllers 22, the circuit size of the ASIC 2 can be reduced, as well as the number of parts in the circuit is reduced, thus reducing the circuit cost.

Figure 3:
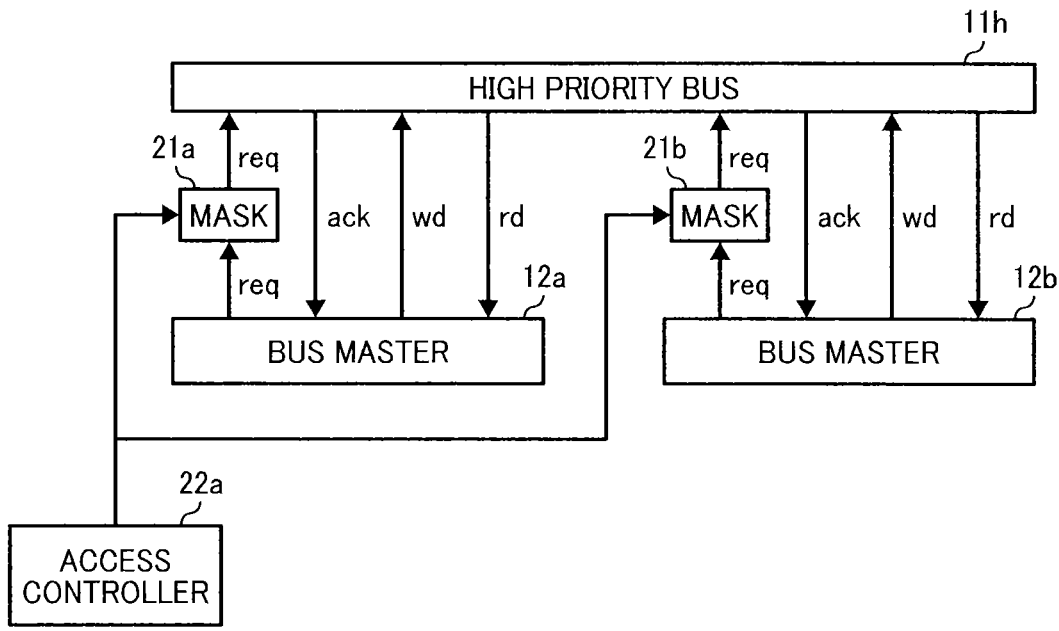
FIG. 3 is an illustration for explaining connections between an access controller and a plurality of masks in FIG. 2.

In this example, the masks 21*a* to 21*h* are connected such that the req signals output from the bus masters 12*a* to 12*h* to the buses 11*h*, 11*m*, and 11*l* can be masked. For example, in the example case of the masks 21*a* and 21*b* provided for the high-priority bus 11*h* as illustrated in FIG. 3, the masks 21*a* and 21*b* are connected such that the req signals output from the bus masters 12*a* to 12*b* to the high-priority bus 11*h* can be masked. More specifically, the access controller 22*a* outputs the mask signal to the mask 21*a* or 21*b* to mask the req signal. Further, the bus obtaining request signal ("req signal"), the bus obtaining acknowledge signal ("ack signal"), and the write data ("wd"), and the read data ("rd") are transferred between the bus masters 12*a* to 12*f*, and the bus 11*h*, bus 11*m*, and bus 11*l*. The signal or data is transferred in any desired protocol such as AXI or OCP. Unless the req signal is not received from the corresponding one of the bus masters 12*a* to 12*h*, the bus 11*h*, bus 11*m*, or bus 11*l* does not output the ack signal. Through masking the req signal from the outside of the bus 11*h*, bus 11*m*, or bus 11*l*, the bus 11*h*, bus 11*m*, or bus 11*l* can only detect the idle state, even when any one of the bus masters 12*a* to 12*h* outputs the bus obtaining request.

The access controllers 22*a* to 22*c* are respectively provided for the bus masters 12*a* and 12*b* connected to the high-priority bus 11*h*, the bus masters 12*c* to 12*f* connected to the medium-priority bus 11*m*, and the bus masters 12*g* and 12*h* connected to the low-priority bus 11*l*. As illustrated in FIG. 3, each of the access controllers 22*a*, 22*b*, and 22*c* controls mask for the corresponding bus masters 12*a* and 12*b*, 12*c* to 12*f*, and 12*g* and 12*h*.

Figure 4:
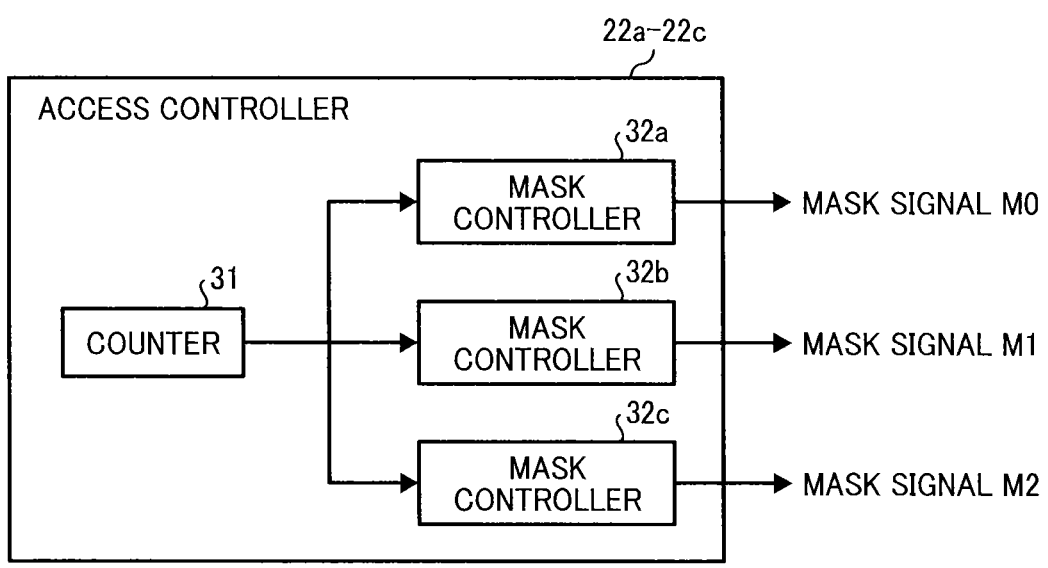
FIG. 4 is a schematic block diagram illustrating an access controller of the image processing apparatus of FIG. 1.

As illustrated in FIG. 4, the access controllers 22*a* to 22*c* are each provided with a counter 31, and a plurality of mask controllers 32*a* to 32*c* (in this example, 3) each of which has the function of controlling a signal. As the counter 31 is reset, the counter 31 starts counting a time period to measure a mask time period.

For simplicity, the mask controllers 32*a* to 32*c* may each or collectively be referred to as the mask controller 32. The mask controller 32 outputs the mask signals M0 to M2 (collectively referred to as the mask signal "M") to the corresponding masks of the bus masks 21*a* to 21*h*, based on the counter value of the counter 31. The mask signal M indicates on or off of mask operation. While the mask signal M is being input to the corresponding one of the masks 21*a* to 21*h*, the req signal output from the corresponding one of the bus masters 12*a* to 12*h* for the corresponding one of the buses 11*h*, 11*m*, and 11*l*, is masked.

Figure 5A:
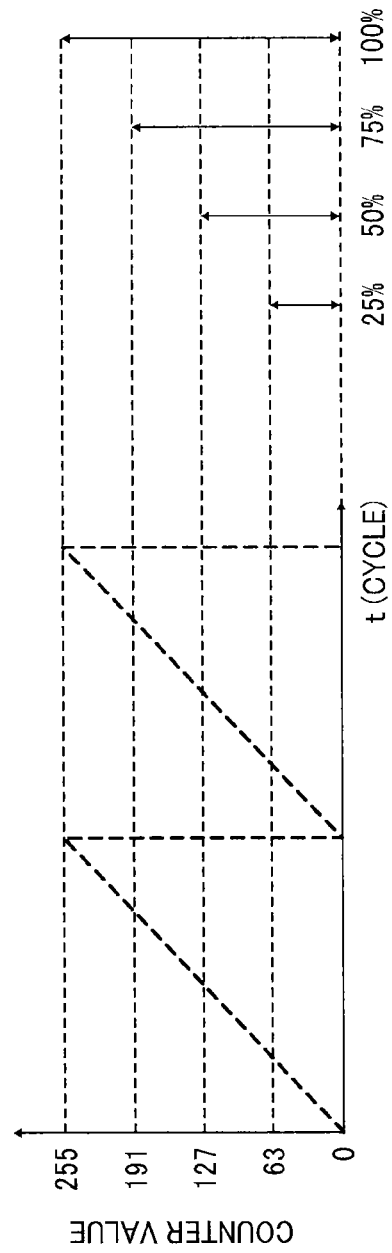
FIGS. 5A and 5B are an illustration for explaining mask control by the access controller of the image processing apparatus of FIG. 1.
Figure 5B:
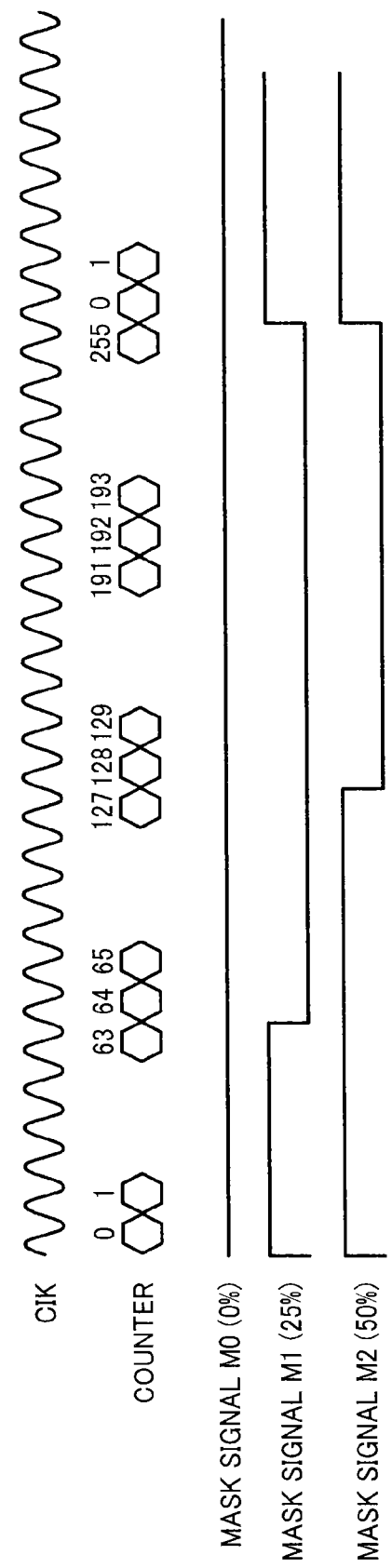

For the access controller 22, the counter 31 is implemented by a 8-bit counter, which counts from "0" to "255", such that the circuit structure can be simplified. As illustrated in FIGS. 5A and 5B, the mask controller 32 compares the counter value of the counter 31 with a predetermined threshold, and outputs the mask signals M0 to M2 for a counter time period that is previously set by the threshold to the corresponding one of the bus masks 21*a* to 21*h*. More specifically, the mask controllers 32a to 32c are each provided with a comparator, which compares the counter value of the counter 31 with a threshold value previously set. The mask time period is set based on the square-root-value, thus simplifying the circuit structure.

In this example, the mask controllers 32a to 32c together mask all counter values. For example, the mask controller 32a outputs the mask signal M0 that masks 0%. The mask controller 32b outputs the mask signal M1 that masks 25% during the counter values "0" to "63". The mask controller 32c outputs the mask signal M2 that masks 50% during the counter values "0" to "127". The output mask signals M0 to M2 are respectively output to the bus masks 21a to 21h.

In any one of the access controller 22a to 22c, the masks 21 of the masks 21a to 21h subjected for mask control by corresponding one of the mask controllers 32a to 32c of the access controller 22 are respectively input with the req signals from the corresponding bus masters 12 of the bus masters 12a to 12h, which are subjected for mask control by the access controller 22. For each of the mask controllers 32a to 32c, the mask controller 32 monitors the bus masters 12 of the bus masters 12a to 12h subjected for control by the mask controller 32, which are provided for the same access controller 22. More specifically, the mask controller 32 monitors the bus master 12 having a priority higher than, and a mask time period shorter than, that of the other bus masters 12 subjected for control by the mask controller 32. When the req signal from such bus master 12 has the negate value, the mask signal being output from the mask controller 32 is made off even during the mask time period.

In one example, it is assumed that the system on a chip (SoC) is connected to the bus 11, and a CPU is provided while the SoC functions as a bus master. When the CPU is not assigned with a sufficient memory area, the system capability of the image processing apparatus 1 will be reduced. In order to avoid this, the Soc functioning as the bus master is connected to the bus having the higher priority, such as the high-priority bus 11h.

With the above-described circuit structure, the size of the image processing apparatus 1 can be reduced. Further, the bus range can effectively be assigned to the bus with higher priority such as the bus masters 12a and 12b and the bus masters 12c to 12f, while restricting the use by the lower priority bus such as the bus masters 12g and 12h.

In the image processing apparatus 1, the scanner 4 or the plotter 5 transfers data, according to mechanical operation causing line scanning for reading an original image or writing an image on a recording sheet. In case any of the bus masters 12a and 12b that are respectively connected to the scanner 4 and the plotter 5 is not assigned with a sufficient memory area, an error in outputting an image may occur. Thus, it is desirable to have the high isochronous transfer capability for the bus masters 12a and 12b that ensures transfer on a line unit basis, such that these bus masters 12a and 12b are connected to the high-priority bus 11h.

In the image processing apparatus 1, for the compressor 14, the expander 15, the rotator 16, and the HDD 6, processing is usually performed one page by one page, and such processing often relates to image processing for scanning or printing operation. Unless the bus masters 12c to 12f connected to the compressor 14, expander 15, rotator 16, and HDD 6 are not assigned with a sufficient memory range, the capability of the image processing apparatus 1 may be lowered. It is thus desirable to have the sufficiently high isochronous transfer capability for the bus masters 12c to 12f that ensures transfer on a page unit basis, such that these bus masters 12c to 12f are connected to the medium-priority bus 11m having a medium priority level.

In the image processing apparatus 1, the network I/F 7 and the USB I/F 8 control communication with respect to the network or the USB device. Even when the bus masters 12g and 12h connected to the network I/F 7 and the USB I/F 8 are not assigned with a sufficient memory range, the image processing apparatus 1 alone does not suffer from an error, such as a communication error. Thus, the bus masters 12g and 12h are connected to the low-priority bus 11l having the lowest priority.

The high-priority bus 11h, the medium-priority bus 11m, and the low-priority bus 11l are connected to the upper priority bus 11t. The upper priority bus 11t arbitrates accesses to the slave 13 according to the priority of the buses 11h, 11m, and 11l, using the round-robin or LRU technique.

More specifically, the upper priority bus 11t arbitrates the req signals from the high-priority bus 11h, the medium-priority bus 11m, and the low-priority bus 11l, to the slave 13, according to the priority defined as: high-priority bus 11h>the medium-priority bus 11m>the low-priority bus 11l.

The masks 21a to 21h are arranged between the bus masters 12a to 12h and the corresponding buses 11b, 11m, and 11l. For the masks 21a to 21h, the access controllers 22a to 22c are provided so as to correspond to the respective groups for the buses 11h, 11m, and 11l. The access controller 22a is connected to the mask 21a and the mask 21b. The access controller 22b is connected to the masks 21c to 21f. The access controller 22c is connected to the masks 21g and 21h. The groups of bus masters, that is, bus masters 12a and 12b, the bus masters 12c to 12f, and the bus masters 12g and 12h are each masked with a predetermined mask condition to assign the priority within the group.

As described above referring to the example case of the masks 21a and 21b illustrated in FIG. 3, the masks 21a to 21h mask the req signals to the buses 11h, 11m, and 11l from the bus masters 12a to 12h.

As illustrated in FIG. 4, the access controllers 22a to 22c are provided respectively for the buses 11h, 11m, and 11l. The access controllers 22a to 22c mask the accesses to the buses 11h, 11m, and 11l, from the bus masters 12a and 12b, the bus masters 12c to 12f, and the bus masters 12g and 12h that are respectively connected to the bus 11h, bus 11m, and bus 11l.

More specifically, the access controllers 22a to 22c are each provided with a 8-bit counter, which counts from "0" to "255". For example, as illustrated in FIGS. 5A and 5B, the mask controllers 32a to 32c each compares the counter value of the counter 31 with a predetermined threshold value. The mask controllers 32a to 32c respectively output the mask signals M0 to M2 having the on value to the corresponding bus masks 21 of the bus masks 21a to 21h during the counted time period that is previously set.

As illustrated in FIG. 2, in the ASIC 2, the bus 11 includes a plurality of buses 11h, 11m, and 11l, which form a layer structure. The buses 11h, 11m, and 11l are respectively connected to the upper priority bus 11t. The ASIC 2 is further provided with the masks 21a to 21h, which mask req signals from the bus masters 12a to 12h connected to the buses 11h, 11m, and 11l. The ASIC 2 is further provided with the access controllers 22a to 22c to control the masks 21a and 21b, the masks 21c to 21f, and the masks 21g and 21h, for the buses 11h, 11m, and 11l. In each of the access controller 22a to 22c, a counter 31 is provided to generate a mask signal that controls operation of the masks 21a to 21c. With this mask signal, the bus masters 12a to 12h are set with priority to arbitrate the use of bus range, thus arbitrating access to the DDR-SDRAM 3.

The access controllers 22*a* to 22*c* may allow the use of the DDR-SDRAM 3, which may be prohibited as the req is masked, in case the high-priority bus masters 12*a* to 12*h* are not operated. The mask controllers 32*a* to 32*c* monitor input of the req signals to corresponding masks 21 from corresponding bus masters 12 of the bus masters 12*a* to 12*h*, which are subjected for control by the mask controllers 32*a* to 32*c* provided for the same access controller 22. More specifically, the mask controller 32 monitors the bus masters 12 subjected for mask control for the bus master 12 having a priority level higher than, and a mask time period shorter than, that of the other bus masters 12 subjected to control by the mask controller 32. When the req signal from such bus master 12 has the negate value, the mask signal being output from the mask controller 32 is made off even during the mask time period.

When the req from any one of the bus masters 12*a* to 12*h* has a shorter burst length, the mask controller 32 of the access controller 22 may allow transfer of the req signal from such bus master 12, without masking the req signal. With this configuration, in case the req signal has the shorter burst length, lowering the capability of the bus masters 12*a* to 12*h* may be suppressed by allowing transfer of the req signal.

The mask controllers 32*a* to 32*c* of the access controllers 22*a* to 22*c* may allow transfer of the req signals from the bus masters 12*a* to 12*h* without masking, when the transfer destination address from the bus masters 12*a* to 12*h* are different from the slave 3 subjected for control. With this configuration, lowering of capability of the bus masters 12*a* to 12*h* may be suppressed, without controlling accesses to the area other than the access to the slave 3 at which access tends to concentrate.

The access controllers 22*a* to 22*c* may change settings with respect to the mask time period, for example, by changing the settings of threshold values for the mask controllers 32*a* to 32*c*, or changing the number of bits for the counter 31 and the threshold values of the mask controllers 32*a* to 32*c*. With this configuration, the mask time period may be changed depending on software, as well as changing the settings of the mask time period for hardware, thus improving flexibilities.

In the access controllers 22*a* to 22*c*, the threshold values of the mask controllers 32*a* to 32*c* may be respectively set for the memory read request and the memory write request. With this configuration, read and write may be respectively controlled according to characteristics of the bus masters 12*a* to 12*h*, thus utilizing the memory range.

The access controllers 22*a* to 22*c* may each be allowed to freely set with a slave subjected for mask control. With this configuration, setting of the slave may be set depending on software, as well as depending on hardware, thus improving flexibilities in bus control.

In the access controllers 22*a* to 22*c*, for each of the mask controllers 32*a* to 32*c*, the counter value that is previously set may be set differently. The "on" mask signals M0 to M2 that are masked for the respectively counter values are output to the corresponding bus masks of the bus masks 21*a* to 21*h*, so that the mask time periods differ among the bus masters 12*a* to 12*h*. With this configuration, the transfer efficiency improves depending on the group of the bus masters 12*a* to 12*h*.

In the image processing apparatus 1, the mask signal generating function of the access controllers 22*a* to 22*c* may be respectively set. More specifically, on or off of the mask signal generating function of the mask controllers 32*a* to 32*c* may be respectively set. With this configuration, the mask signal generating function may be turned off when an error occurs, thus preventing the occurrence of a bug.

As described above, the image processing apparatus 1 includes a slave 13, a bus 11, a plurality of masks 21*a* to 21*h*, a plurality of bus masters 12*a* to 12*h*, and a plurality of access controllers 22*a* to 22*c*. The bus 11 includes an upper priority bus 11*t*, and a plurality of buses 11*h*, 11*m*, and 11*l*. The plurality of bus masters 12*a* to 12*h* is respectively assigned with different priority levels in accessing the slave 3, and classified into a plurality of groups of bus masters according to the priority level. The plurality of buses 11*h*, 11*m*, and 11*l*, which may be referred to as the plurality of group buses 11*h*, 11*m*, and 11*l*, is classified into a plurality of groups based on a predetermined bus priority level according to the priority level of the plurality of bus masters 12*a* to 12*h*. More specifically, each group bus of the plurality of group buses, is connected to a corresponding group of bus maters, and is assigned with a priority level determined according to the priority levels of the corresponding group of bus masters. The plurality of buses 11*h*, 11*m*, and 11*l* are respectively connected to the upper priority bus 1*t* having a priority higher than the priority level of any one of the plurality of group buses, and to the plurality of bus masters 12*a* to 12*h*, to form a layer structure. The upper bus 11*t* having the higher priority arbitrates a plurality of bus obtaining requests received, respectively, from the plurality of lower buses 11*h*, 11*m*, and 11*l* that are connected to the upper bus 11*t* according to the bus priority level. The plurality of masks 21*a* to 21*h* each masks the bus obtaining request to the corresponding group bus of the plurality of buses 11*h*, 11*m*, and 11*l*, from the corresponding bus master of the bus masters 12*a* to 12*h*. The plurality of access controllers 22*a* to 22*c*, which may each be provided with a plurality of mask controllers, are provided respectively for the plurality of group buses 11*h*, 11*m*, and 11*l* connected to the bus masters 12*a* to 12*h*. The access controllers 22*a* to 22*c* each outputs at least one mask signal that controls operation of at least one corresponding mask of the masks 21*a* to 21*h* connected to the corresponding group of the group buses 11*h*, 11*m*, and 11*l*.

With the reduced number of access controllers 22*a* to 22*c*, the size of the ASIC 2 in the image processing apparatus 1 is made smaller. By setting the priority levels respectively with respect to the buses 11*h*, 11*m*, 11*l*, and 11*t* of the bus 11, the use of a bus range can be assured for the higher priority bus master, while restricting the bus use by the lower priority bus master.

In one aspect of the present invention, the bus control device, which may be incorporated in the image processing apparatus 1, performs a bus control method. The bus control method includes the steps of arbitrating a plurality of bus obtaining requests received, respectively, from the plurality of bus masters 12*a* to 12*h* addressed to the plurality of lower buses 11*h*, 11*m*, and 11*l* that are connected to the upper bus 11*t* according to the bus priority level; masking the bus obtaining request addressed to the corresponding group bus of the buses 11*h*, 11*m*, and 11*l* from the corresponding bus master of the bus masters 12*a* to 12*h*; and outputting at least one mask signal that controls operation of at least one corresponding mask connected to the corresponding group bus.

With the reduced number of access controllers 22*a* to 22*c*, the size of the ASIC 2 in the image processing apparatus 1 is made smaller. By setting the priority levels respectively with respect to the buses 11*h*, 11*m*, 11*l*, and 11*t* of the bus 11, the use of a bus range can be assured for the higher priority bus master, while restricting the bus use by the lower priority bus master.

In this example, the bus 11 of the ASIC 2 is implemented to form a two-layer structure, such that the bus 11 includes the group of the high-priority bus 11*h*, the medium-priority bus 11*m*, and the low-priority bus 11*l*, and the upper priority bus 11*t* connected to the group of buses 11*h*, 11*m*, and 11*l*, which is provided below the slave 3. The upper priority bus 11*t* arbitrates the bus obtaining requests from the group of buses 11*h*, 11*m*, and 11*t* according to the bus priority. With the ASIC 2 having a bus structure of FIG. 1, which may be incorporated in the image processing apparatus 1, the number of access controllers 22*a* to 22*c* can be reduced, thus making the overall size of the apparatus smaller. By setting the priority levels respectively with respect to the buses 11*h*, 11*m*, 11*l*, and 11*t*, the use of a bus range can be assured for the higher priority bus master, while restricting the bus use by the lower priority bus master.

Further, the access controllers 22*a* to 22*c* of the bus control device of the image processing apparatus 1 are each provided with a predetermined bit (for example, 8-bit) counter 31 that outputs a counter value, and a plurality of mask controllers 32*a* to 32*c* each capable of controlling the mask signal based on comparison between the counter value of the counter 31 and a predetermined threshold. Accordingly, operation of the masks 21*a* to 21*h* can be controlled with the access controllers 22*a* to 22*c* each having a simplified structure, thus, making the size of the ASIC 2 smaller.

In the bus 11 of the ASIC 2, of the buses 11*h*, 11*m*, 11*l* and the bus 11*t* that are connected in layer, the upper priority bus 11*t* arbitrates the bus obtaining requests from the lower buses 11*h*, 11*m*, and 11*l*, for example, using the priority-based round robin technique. With this configuration, each of the lower buses 11*h*, 11*m*, and 11*l* do not have to be installed with an arbitrator, such that the QoS can be implemented according to the priority levels of the lower buses 11*h*, 11*m*, and 11*l*, with the smaller circuit size and the less cost.

In the access controllers 22*a* to 22*c* of the image processing apparatus 1, one or more masks 21 of the plurality of masks 21*a* to 21*h* that are subjected for mask control by the corresponding access controller 22 are respectively input with the bus obtaining requests output from corresponding bus masters 12 of the bus masters 12*a* to 12*h*. Only when the request from the bus master 12 having a priority level higher than that of the bus master 12 subjected for mask control has an assert value, the access controller 22 outputs the mask signal that masks the request from the bus master 12 subjected for mask control. With this configuration, when the master 12 having a priority level higher than that of the master 12 subjected for mask control is not operated, the memory area can be utilized, thus increasing operability.

Numerous additional modifications and variations are possible in light of the above teachings. It is therefore to be understood that within the scope of the appended claims, the disclosure of the present invention may be practiced otherwise than as specifically described herein. With some embodiments of the present invention having thus been described, it will be obvious that the same may be varied in many ways. Such variations are not to be regarded as a departure from the spirit and scope of the present invention, and all such modifications are intended to be included within the scope of the present invention. For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc. Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

What is claimed is:

1. A bus control device comprising:
a plurality of bus masters respectively assigned with different priority levels in accessing a slave, and classified into a plurality of groups of bus masters according to the priority level;
a plurality of group buses, each group bus being connected to a corresponding group of bus masters, and being assigned with a priority level determined according to the priority levels of the corresponding group of bus masters;
an upper priority bus having a priority level higher than the priority level of any one of the plurality of group buses and configured to arbitrate a plurality of bus obtaining requests received from the plurality of bus masters via the plurality of group buses;
a plurality of masks respectively provided for the plurality of bus masters and each configured to mask the bus obtaining request addressed to the corresponding group bus from the corresponding bus master before the bus obtaining request reaches the corresponding group bus; and
a plurality of access controllers respectively provided for the plurality of group buses, and each configured to output at least one mask signal that controls operation of at least one corresponding mask connected to the corresponding group bus, wherein each access controller includes:
a counter configured to output a counter value based on a predetermined number of bits; and
at least one mask controller configured to control the at least one mask signal based on comparison between the counter value and a threshold counter value.

2. The bus control device of claim 1, wherein
the upper priority bus and the plurality of group buses are connected to form a layer structure, and
the upper priority bus arbitrates the plurality of bus obtaining requests received from the plurality of bus masters via the plurality of group buses according to the priority levels assigned to the plurality of group buses.

3. The bus control device of claim 1, wherein the upper priority bus arbitrates the plurality of bus obtaining requests using a priority-based round robin technique.

4. The bus control device of claim 1, wherein one of the plurality of access controllers includes:
a plurality of mask controllers each configured to control operation of corresponding one mask of the plurality of masks subjected for mask control, which receives the bus obtaining request output from the corresponding one bus master of the plurality of bus masters, and to output a mask signal that masks the bus obtaining request output from the bus master subjected for mask control, only when the bus obtaining request output from the other one of the bus masters having a priority level higher than that of the bus master subjected for mask control has an assert value.

5. An image processing apparatus, comprising:
the bus control device of claim 1; and
a device configured to transfer image data via a bus controlled by the bus control device and apply image processing to the image data.

6. A bus control method performed by a bus control device, the bus control device comprising:
a plurality of bus masters respectively assigned with different priority levels in accessing a slave, and classified into a plurality of groups of bus masters according to the priority level; a plurality of group buses, each group bus being connected to a corresponding group of bus masters, and being assigned with a priority level determined according to the priority levels of the corresponding group of bus masters; an upper priority bus having a priority level higher than the priority level of any one of the plurality of group buses; a plurality of masks respectively provided for the plurality of bus masters; and a plurality of mask controllers respectively provided for the plurality of group buses,
the method comprising:
arbitrating a plurality of bus obtaining requests received from the plurality of bus masters via the plurality of group buses;
masking the bus obtaining request addressed to the corresponding group bus from the corresponding bus master before the bus obtaining request reaches the corresponding group bus; and
outputting at least one mask signal that controls operation of at least one corresponding mask connected to the corresponding group bus, wherein the outputting includes:
outputting a counter value based on a predetermined number of bits, using a counter; and
controlling the at least one mask signal based on comparison between the counter value and a threshold counter value.

7. The bus control method of claim 6, wherein the upper priority bus and the plurality of group buses are connected to form a layer structure, the arbitrating comprising:
arbitrating the plurality of bus obtaining requests received from the plurality of bus masters via the plurality of group buses according to the priority levels assigned to the plurality of group buses.

8. The bus control method of claim 6, the arbitrating includes:
arbitrating the plurality of bus obtaining requests using a priority-based round robin technique.

9. The bus control method of claim 6, wherein the outputting includes:
providing a plurality of mask controllers for one of the plurality of access controllers, the mask controller being configured to control operation of corresponding one mask of the plurality of masks subjected for mask control, which receives the bus obtaining request output from the corresponding one bus master of the plurality of bus masters; and
outputting a mask signal that masks the bus obtaining request output from the bus master subjected for mask control, only when the bus obtaining request output from the other one of the bus masters having a priority level higher than that of the bus master subjected for mask control has an assert value.

10. The bus control device according to claim 1, wherein the at least one mask signal prescribes an amount of bus obtaining requests to mask.

11. The bus control device according to claim 10, wherein the amount of bus obtaining requests is a percentage of bus obtaining requests to mask.

12. The bus control device according to claim 1, wherein the at least one mask controller is configured to output the at least one mask signal for a time period of the counter.

13. The bus control method according to claim 6, wherein the at least one mask signal prescribes an amount of bus obtaining requests to mask.

14. The bus control method according to claim 13, wherein the amount of bus obtaining requests is a percentage of bus obtaining requests to mask.

15. The bus control method according to claim 6, wherein controlling the at least one mask signal includes outputting the at least one mask signal for a time period of the counter.

16. The bus control device according to claim 1, wherein the threshold counter value corresponds to a plurality of counter values.

17. The bus control device according to claim 1, wherein the at least one mask controller is configured to control the at least one mask signal based on comparison between the counter value and a plurality of threshold counter values.

18. The bus control device according to claim 17, wherein each of the plurality of threshold counter values corresponds to a different plurality of counter values.

19. The bus control device according to claim 1, wherein the threshold counter value is configurable.

20. The bus control device according to claim 17, wherein time periods for masking based upon the at least one mask signal differ among the plural of bus masters.

* * * * *